(12) United States Patent
Hesse et al.

(10) Patent No.: US 6,177,382 B1
(45) Date of Patent: Jan. 23, 2001

(54) PREPARATION OF SPINEL EXTRUDATES

(75) Inventors: Michael Hesse, Worms; Otto Kumberger, Mannheim, both of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/275,801

(22) Filed: Mar. 25, 1999

(30) Foreign Application Priority Data

Mar. 25, 1998 (DE) .............................................. 198 13 171

(51) Int. Cl.$^7$ ................................ B01J 23/72; B01J 21/04
(52) U.S. Cl. .................... 502/439; 502/303; 502/304; 502/305; 502/306; 502/308; 502/309; 502/310; 502/311; 502/312; 502/313; 502/317; 502/318; 502/321; 502/322; 502/323; 502/325; 502/328; 502/330; 502/331; 502/332; 502/340; 502/341; 502/349; 502/350; 502/351; 502/352; 502/353; 502/354; 502/355
(58) Field of Search .................... 502/303, 304, 502/305, 306, 308, 309, 310, 311, 312, 313, 317, 318, 321, 322, 323, 325, 328, 330, 331, 332, 340, 341, 349, 350, 351, 352, 353, 354, 355, 439

(56) References Cited

U.S. PATENT DOCUMENTS

| | | | |
|---|---|---|---|
| Re. 34,853 | * 2/1995 | DeAngelis et al. | 502/439 |
| 3,907,666 | * 9/1975 | Chun et al. | 208/191 |
| 3,974,255 | 8/1976 | Erickson et al. | 423/212 |
| 4,631,267 | 12/1986 | Lachman et al. | 502/439 |
| 4,631,268 | 12/1986 | Lachman et al. | 502/439 |
| 4,814,153 | 3/1989 | Kobayashi et al. | 423/213 |
| 5,219,816 | 6/1993 | Zhou et al. | 502/223 |
| 5,525,211 | 6/1996 | Sudhakar et al. | 208/217 |
| 5,567,150 | * 10/1996 | Conwell et al. | 432/13 |
| 5,587,135 | 12/1996 | Fetzer et al. | 423/239 |
| 5,736,114 | 4/1998 | Barthe et al. | 423/213 |

FOREIGN PATENT DOCUMENTS

| | | |
|---|---|---|
| 3619337 | 12/1986 | (DE) . |
| 43 01 470 | 7/1994 | (DE) . |
| 4419974 | 3/1996 | (DE) . |
| 19546482 | 6/1997 | (DE) . |
| 19653200 | 6/1998 | (DE) . |
| 045170 | 2/1982 | (EP) . |
| 210681 | 2/1987 | (EP) . |
| 676232 | 10/1995 | (EP) . |
| 779093 | 6/1997 | (EP) . |

* cited by examiner

Primary Examiner—Elizabeth D. Wood
(74) Attorney, Agent, or Firm—Keil & Weinkauf

(57) ABSTRACT

In a process for preparing spinel extrudates by extruding molding compositions comprising spinel powder with or without extrusion assistants, stabilizers, shrinkage reducers, pore-formers or mixtures thereof subsequent drying and calcination of the extrudates, the molding composition further comprises aluminum oxides or aluminum oxide hydrates and metal nitrates.

8 Claims, No Drawings

PREPARATION OF SPINEL EXTRUDATES

BACKGROUND OF THE INVENTION

1. Field of the Invention

This invention relates to a process for preparing spinel extrudates, especially extrudates in honeycomb form, which, when dried and calcined, are useful as catalysts.

2. Description of the Prior art

The combustion of hydrocarbons with air as oxidant gives rise, particularly with excess air and high temperatures, to nitrogen oxides through oxidation of the nitrogen present in the air. Examples of such nitrogen oxides are NO, $NO_2$, $NO_3$, $N_2O_3$, $N_2O_4$ and $N_2O_5$. Being pollutants, the nitrogen oxides should be removed as completely as possible from the combustion exit gases to avoid burdening the environment. Whereas power plant and industrial emissions are being progressively curtailed through the use of exit gas treatment facilities, abating the pollutant fraction in motor vehicle exit or exhaust gases is becoming more and more important, especially against the background of the increasing number of motor vehicles.

Many solutions have been proposed for abating $NO_x$ emissions from motor vehicle engines. Effective solutions for abating $NO_x$ levels have to meet a multiplicity of criteria, especially if catalysts are used, for example:

high conversion ratio, i.e., substantial $NO_x$ removal, even at high and low temperatures and in the event of frequent load changes during operation avoidance of the use of auxiliary materials such as ammonia or urea low manufacturing and operating costs long onstream time low $N_2O$ production high mechanical catalyst stability.

A number of catalysts have been proposed for reducing nitrogen oxides. One train in the development of suitable catalysts is moving in the direction of spinel catalysts.

The use of copper-impregnated $CuAl_2O_4$ spinels as exit gas catalyst is described in DE-A-195 46 482. The spinels are used in the form of spall.

EP-A-0 779 093 describes corresponding spinel catalysts for reducing nitrogen oxides and for oxidizing hydrocarbons. The spinels are based on zinc, copper and aluminum and are used in the form of spall.

EP-A-0 676 232 describes spinel catalysts useful for exit gas treatment, which abate nitrogen oxide levels in the exit gas. They are zinc aluminum spinels which are obtainable by precipitation from precursor solutions. The precipitation products can be dried by spray drying or flash evaporation of the solvent and are obtained as powders. It is also possible to mix the catalyst precursors with, for example, urea or glycine and to burn the mixture, in which case not only spinel formation but at the same time also, owing to the high temperature, a calcination takes place. It is stated that the catalysts can be present in the form of honeycombs, but a manufacturing process for honeycomb structures is not described.

Spinel catalysts are preferably used in motor vehicles not in the form of spall or granulate, but in the form of honeycomb structures which consist of the catalyst material and possess a number of essentially parallel channels through which the gas to be treated flows. In cross-sectional view, such honeycomb structures may correspond to honeybee combs, for example. The individual channels may also have a round or rectangular or especially square cross section, so that the cross section through the honeycomb structure corresponds to a right-angled grid pattern. Various processes have been proposed for preparing spinel honeycomb structures.

DE-C-36 19 337 describes a process for preparing $TiO_2$—$SiO_2$ oxide compounds which may further contain zirconium dioxide. An aqueous solution comprising active constituents such as vanadium and copper, or a powder of the active constituents in the form of the oxides is added together with a molding assistant to a titanium-containing oxide, such as $TiO_2$, $TiO_2$—$SiO_2$ and $TiO_2$—$SiO_2$—$ZrO_2$. The constituents are then mixed and kneaded while a suitable amount of water is added. The mixture is then molded in an extruder molding apparatus. The molded product is dried and calcined.

DE-A-44 19 974 relates to a process for preparing a molded catalyst based on titanium oxide and its use. The catalyst can be in the form of a honeycomb structure. It is prepared by kneading calcined titanium dioxide powder in a mixture with water, an ammonium metatungstate solution, polyethylene glycol as plasticizing assistant, monoethanolamine and glass fibers. This homogeneous kneaded material is molded in an extrude into honeycombs and the honeycomb catalysts are subsequently dried and calcined.

U.S. Pat. No. 5,219,816 relates to dehydrogenation catalysts and process for their preparation. For preparing the support which is based on a spinell, magnesium nitrate and an aluminium oxide material are mixed and extruded into a suitable mold. After drying calcination is performed at temperatures from 600 to 700° C.

The preparation of honeycomb structures, especially copper-aluminum spinels, by existing processes has a number of disadvantages.

The extrusion of the molding material into honeycomb structures requires a long feed time, which corresponds to a low feed speed. Frequently, only feed speeds of 5 to 10 cm/min are achieved.

The drying time for the extruded honeycomb structures is very long. It is frequently at least one month at room temperature.

As they dry and in the course of the subsequent calcination, the honeycomb structures are generally prone to undergo distortion, for example parallelogram distortion and pincushion distortion, and develop longitudinal and transverse cracks. Even prolonging the drying time does not led to better results.

Such honeycomb structures are mechanically unstable because of the cracks and distortions, and lead to a nonuniform gas flow through the catalyst, so that it is difficult or even impossible for constant reaction conditions to be established over the catalyst. In addition, for example in motor vehicle catalysts, the honeycomb structures are fitted into an overcoat. When parallogram distortions and pincushion distortions are present, the honeycomb structures will no longer finish flush with the overcoat, so that exhaust gas can bypass the catalyst, greatly reducing catalyst performance as a whole. In this case, the catalyst considered as a whole thus exhibits diminished activity.

SUMMARY OF THE INVENTION

It is an object of the present invention to provide a process for preparing spinel extrudates, especially spinel honeycomb structures, which avoids the disadvantages of existing processes and leads to uniform, undistorted honeycomb structures which are free from cracks, which possess high mechanical stability and sustained use strength and which are impervious to temperature changes. They shall fit readily into dedicated components, for example overcoats, so that maximum activity is achieved in operation. In addition, the manufacturing process shall be speeded up compared with existing processes.

We have found that this object is achieved according to the invention by a process for preparing spinel extrudates by extruding molding compositions comprising spinel powder with or without extrusion assistants, stabilizers, shrinkage reducers, pore-formers, peptizing assistants or mixtures thereof, subsequent drying and calcination of the extrudates, wherein the molding composition further comprises aluminum oxides or aluminum oxide hydrates and metal nitrates. Metal nitrates which give an acidic reaction in aqueous solution are preferred. Particular preference is given to copper nitrate. Instead of the preferred $Cu(NO_3)_2 \cdot 3 H_2O$ it is also possible to use hydrates containing fewer or more moles of water of crystallization. Moreover, it is also possible to use other metal nitrates provided their cations are spinel-formers and the presence of the resulting metal oxides is desirable in the catalyst.

The molding material is preferably extruded into honeycomb structures, as described at the beginning. Typical honeycomb structures have channels from 1 to 5 mm in diameter and from 0.2 to 5 mm in partition wall thickness.

The process of the invention makes it possible to prepare spinel honeycomb structures which are free from distortions and cracks. The extrusion of the molding materials into honeycomb structures can take place at feed speeds of up to 80 cm/min. The drying time at room temperature is generally only about one week. The honeycomb structures obtained are very stable mechanically and with regard to temperature fluctuations.

A multiplicity of spinel powders can be used according to the present invention. Suitable spinel powders are described for example in EP-A-0 676 232, EP-A-0 779 093, DE-A-195 46 482 and also in DE-A-196 53 200, which was unpublished at the priority date.

Spinels are described for example in C. W. Correns, Einführung in die Mineralogie, Springer Verlag 1949, pages 77 to 80. Further descriptions may be found in H. Remy, Lehrbuch der anorganischen Chemie, Akademische Verlagsgesellschaft Geest & Portig K.-G. Leipzig 1950, pages 308 to 311, and also in Roempp, Chemielexikon, 9th edition 1995, page 4245. Spinels are formally derived from $MgAl_2O_4$. Magnesium may be replaced by other divalent ions such as zinc, copper, iron. Aluminum may be replaced by other trivalent ions, such as iron or chromium. In the spinel lattice the oxygen atoms form a cubic close-packed structure corresponding to a face-centered lattice. Half of the octahedral vacancies therein are occupied by aluminum, the other half of the vacancies are empty. One eighth of the tetrahedral vacancies are occupied by magnesium.

Preference is given to using a copper-aluminum spinel powder which may be 0–10% by weight replaced by $ZrO_2$, $CeO_2$, $SnO_2$, $WO_3$, $MoO_3$, $TiO_2$, $V_2O_5$, $Nb_2O_3$, $La_2O_3$ or mixtures thereof and additionally doped with noble metals.

The spinel powders preferably have a mean particle size of from 0.1 to 50 µm, particularly preferably of from 1 to 30 µm, especially of from 2 to 10 µm. They are obtainable by various processes as exemplified in the references cited above.

DETAILED DESCRIPTION OF THE INVENTION

The spinel powders may be prepared for example by mixing the pulverulent oxides of the metals present in the spinel, pressing the oxide mixtures, and calcination. The calcination temperature is preferably not less than 700° C. Examples of suitable oxides are $ZrO_2$, $SiO_2$, $Al_2O_3$, $TiO_2$, $CeO_2$, $SnO_2$, $WO_3$, $MoO_3$, $Nb_2O_3$, $La_2O_3$ and $V_2O_5$.

The preparation may also take the form of mixing with metal salt solutions of the metals present in the spinel, subsequent precipitation, drying and calcination. Instead of a solution it is also possible to use a suspension of the metal salts. Preference is given to using the salts with inorganic acids, such as nitrates, sulfates, carbonates or halides-depending on the solubility. It is also possible to use salts of organic acids. Examples are formates, acetates, propionates, oxalates or citrates. The precipitation may be brought about by addition of precipitants such as ammonia, alkali metal carbonate, basic alkali metal carbonate or hydroxides.

Moreover, the solutions may be dried and pulverized by spraying drying or flash evaporation. Drying may be followed by a calcination step at preferably not less than 600° C.

Furthermore, the compounds of the precursor metals of the spinel may be mixed with a carbon and nitrogen source to form a mixture which is then burned. The burning results in high temperatures in which the spinels are formed. Examples of suitable carbon and nitrogen sources are organic compounds such as urea or glycine.

Further suitable manufacturing processes are described in DE-A-42 24 881 for example. For example, metal oxides such as AlOOH (boehmite), CuO, ZnO and optionally further suitable metal oxides may be kneaded with water in the presence of a binder, extruded, dried and calcined, in which case the extrudates obtained may be pulverized. Instead of the metal oxides it is possible to use the corresponding hydroxides, oxide hydrates, carbonates, sales of organic acids, nitrates, chlorides, sulfates or phosphates as described above. To prepare bimodal or polymodal catalysts, AlOOH may be replaced by a mixture of AlOOH and $Al_2O_3$, preferably γ- or δ-$Al_2O_3$. $Al_2O_3$ having different pore size distributions may be used for this purpose.

Drying preferably takes place at from 10 to 200° C., particularly preferably at from 20 to 150° C., especially at from 30 to 120° C. Freeze-drying is also possible (for example at from −40 to 0° C., from 0.05 to 0.8 bar). Freeze-drying is particularly gentle, but also more time-consuming. The geometric shape is sufficiently well preserved. Calcination preferably takes place at from 600 to 900° C.

Existing processes extrude a spinel powder as described above, or a mixture of the precursor salts, into a honeycomb structure.

This invention, in contrast, admixes the spinel powder—optionally alongside extrusion assistants, stabilizers, shrinkage reducers, pore-formers, peptizing assistants or mixtures thereof—additionally with aluminum oxides or aluminum oxide hydrates and metal nitrates. Preference is given to using aluminum oxide hydrate and, for example, copper nitrate in a molar ratio of Cu:Al of from 0.3 to 0.7, particularly preferably of from 0.4 to 0.6. The aluminum oxide hydrate used is preferably aluminum oxide hydroxide, aluminum trihydroxide or mixtures thereof. The metal salts may be used in the form of their hydrates. The amount of aluminum oxide hydrate and metal nitrate is preferably within the range from 15 to 55% by weight, based on the amount of spinel powder. The spinel powder is kneaded with the additional constituents into a plastic material, which is then extruded into extrudates, especially honeycomb structures. The extrudate is then preferably dried at from 10 to 200° C., particularly preferably at from 20 to 150° C., especially at from 30 to 120° C., and calcined at from 500 to 900° C. Adding the aluminum oxide hydrate and metal nitrate makes it possible to obtain the distortion-and-crack-free honeycomb structures of the invention. To date, it is not known exactly what this effect is attributable to.

The mixing ratio of aluminum oxide hydrate to metal nitrate (copper nitrate) is preferably chosen in such a way that it corresponds to the mixing ratio present in a spinel. Based on the spinel powder present, preference is given to adding from 5 to 25% by weight of AlOOH and from 10 to 30% by weight of metal nitrate (e.g., $Cu(NO_3)_2.3\ H_2O$). The molar ratio of metal oxide to $Al_2O_3$ in these spinel $Al_2$ precursors should not be significantly substoichiometric. The molar ratio should preferably be within the range from 0.6 to 1.4.

Instead of AlOOH (boehmite) it is also possible to use $Al(OH)_3$ (bayerite or hydrargillite) or other aluminum oxide hydrates and mixtures thereof. For a description of the large number of suitable aluminum oxide hydrates, see Holleman-Wiberg, Lehrbuch der anorganischen Chemie, Walter D. Gruyter Berlin, New York 1985.

Preference is given to using boehmite and copper nitrate having a water content of from 2 to 6 mol.

The spinel powder used may be prepared in various ways. Examples are the coprecipitation from hydroxides with subsequent calcination, the mixing of the oxides and subsequent calcination, the use of old recycled honeycombs, the use of production scrap and residues, the mixing of the salts, spray drying and subsequent calcination.

The spinel powder and the extrudates obtained therefrom, especially honeycomb structures, may be doped with further oxides such as $ZrO_2$, $CeO_2$, $SnO_2$, $WO_3$, $MoO_3$, $TiO_2$, $V_2O_5$, $Nb_2O_3$, $La_2O_3$ and/or noble metals such as Pt, Pd, Ru, Ag, Au. Doping preferably takes place in amounts of from 0 to 10% by weight, based on the calcined honeycomb structure.

The extrusion of the molding material into honeycomb structures preferably takes place at a feed speed of up to 80 cm/min, according to the invention. The drying time at room temperature is preferably about one week, according to the invention.

The honeycomb structures of the invention are useful as catalysts or catalyst carriers for the catalytic cleanup of exit gases comprising nitrogen oxides. They are consequently intended especially for the denoxing of combustion exit gases, preferably diesel exit gases. However, they are also useful for the denoxing of other $NO_x$-comprising exit gases for example from coal-fired, oil-fired or energy-from-waste power plants. Suitable doping will render the honeycomb structures also useful for the cleanup of $N_2O$-comprising industrial exit gases. Similarly, dioxin decomposition is possible given suitable doping with $TiO_2$, $V_2O_5$ and $WO_3$, and the dioxin decomposition process may take place simultaneously with or immediately following the denoxing. The dioxin decomposition may preferably take place under oxidizing conditions over a $TiO_2/V_2O_5/WO_3$ catalyst as described in EP-A-0 447 537, for example. Other exit gases comprising polyhalogenated compounds can be cleaned up as well. Particular preference is given to using the honeycomb structures—after noble metal doping especially—as hydrocarbon storage capacity supports for a 3-way catalyst.

The Examples hereinbelow illustrate the invention.

EXAMPLE (Inventive) Example 1

Starting Material 3000 g are taken of a copper-aluminum spinel powder which is substoichiometric with regard to Cu. Its loss on ignition is 6%, so that the actual spinel mass is 2820 g. The powder is formally composed from 20%=564 g=7.09 mol of CuO and 80%=2256 g=22.1 mol of $Al_2O_3$. It thus contains 0.32 mol of CuO per mole of $Al_2O_3$, i.e., is strongly substoichiometric. The spinel powder may either be virgin material or be recycled material, for example from the ongoing process. The spinel virgin powder was prepared on the line of the method described in Example 2 of EP-A-0 676 232, namely by mixing copper nitrate and AlOOH in the presence of water, spray drying in a conventional manner and calcination at 800° C.

Admixture of $AlOOH+Cu(NO_3)_2.3H_2O$ 3000 g of the spinel powder mentioned are mixed with a mixture of 402.8 g of moist Pural® (in mineralogical terms boehmit=AlOOH, formally comprising 73.74% of $Al_2O_3$= 297.0 g=2.9 mol of $Al_2O_3$) and 703 g of copper nitrate trihydrate (=232 g=2.9 mol (formally) of CuO). The admixture has equimolar composition, i.e., conforms to the formula $CuAl_2O_4$.

Mixture

The mixture of spinel powder and admixture comprises formally 796 g=10.0 mol of CuO and 2553 g=25.0 mol of $Al_2O_3$. The molar ratio of CuO to $Al_2O_3$ thus is 0.4:1.

Preparation of Plastically Deformable Material 3000 g of spinel powder and 1352 g of admixture are intimately mixed over 5 minutes. Then 246.4 g of carbon fibers, 41 g of Walocel® (hydroxymethylcellulose), 41 g of polyethylene oxide and 2000 g of demineralized water are added, and the material is kneaded for 6 hours. Then 41 g of monoethanolamine are added, and kneading is continued for 7 hours. During kneading, 350 g of vaporized water are replenished. The carbon fibers are 3 mm in length and 5 micrometers in diameter.

Honeycomb Structure Preparation

The honeycombs are extruded in customary extruders, dried and calcined under the following conditions:

| | |
|---|---|
| Extrusion speed: | 50 cm/min |
| Drying time: | 8 days |
| Appearance of calcined honeycombs | satisfactory |
| Mechanical stability: | bursting hardness 181 $N/cm^2$ |
| Temperature change stability: | very good |
| Catalytic activity: | very good, set to 100% |

(Comparative) Example 2

Preparation in situ from copper nitrate trihydrate and beohmite. 4841 g of $Cu(NO_3)_2.3\ H_2O$, 9482 g of AlOOH, 522 g of carbon fibers, 128 g of monoethanolamine, 128 g of lactic acid, 96 g of carboxymethylcellulose and 5020 g of water are mixed and kneaded similarly, to Example 1. The kneaded material is used to produce honeycombs having 160 cells/sq inch (25 cells/$cm^2$).

| Extrusion speed: | 10 cm/min |
|---|---|
| Drying time: | 28 days |
| Bursting hardness: | 50 N/cm$^2$ |
| Catalytic activity: | 80% of that of Example 1 |
| Appearance: | many longitudinal cracks, severe distortion |
| Temperature change stability: | additional cracks appear |

(Inventive) Example 3

Similarly to Inventive Example 1, except with cordierite, but without pressing assistant and pore-former.

The spinel powder and AlOOH and also Cu(NO$_3$)$_2$.3 H$_2$O are mixed as described in Example 1, admixed with 12% of cordierite and 30% of water and processed into honeycombs of 160 cells per sq inch.

| Extrusion speed: | 45 cm/minute |
|---|---|
| Drying time: | 10 days |
| Bursting hardness: | 150 N/cm$^2$ |
| Catalytic activity: | 95% of that of Example 1 |
| Appearance: | slight longitudinal cracks, the honeycombs are dimensionally stable |
| Temperature change stability: | Good |

(Inventive) Example 4

Similarly to Inventive Example 1, but with cordierite. Unlike Inventive Example 3, pressing assistant and pore-former are present. Amounts of starting materials see Table 1.

| Extrusion speed: | 50 cm/minute |
|---|---|
| Drying time: | 10 days |
| Bursting hardness: | 283 N/cm$^2$ |
| Catalytic activity; | 100% of that of Example 1 |
| Appearance: | satisfactory |
| Temperature change stability: | good |

TABLE 1

|  | Inv. Example 1 | | Comp. Example 2 | | Inv. Example 3 | | Inv. Example 4 | |
|---|---|---|---|---|---|---|---|---|
|  | g | % | g | % | g | % | g | % |
| CuO[1] | 564 | 9.0 | — | — | 1128 | 8.3 | 1128 | 7.8 |
| Al$_2$O[1] | 2256 | 36.2 | — | — | 4512 | 33.1 | 4512 | 31.3 |
| Cu(NO$_3$)$_2$.3H$_2$O | 703 | 11.3 | 4841 | 23.8 | 1380 | 10.1 | 1406 | 9.7 |
| AlOOH | 348 | 5.6 | 9482 | 46.6 | 805 | 5.9 | 805 | 5.6 |
| Total computed CuO | 796 | 23.8 | 1600 | 20.0 | 1593 | 23.8 | 1592 | 23.8 |
| Total computed Al$_2$O$_3$ | 2553 | 76.2 | 6400 | 80.0 | 5105 | 76.2 | 5105 | 76.2 |
| Cordierite (Mg$_2$Al$_3$(AlSi$_5$O$_{18}$) | — | — | — | — | 1661 | 12.2 | 1661 | 11.5 |
| Carbon fibers[2] | 246 | 3.9 | 522 | 2.6 | — | — | 613 | 4.2 |
| Hydroxymethylcellulose[3] | 41 | 0.7 | — | — | — | — | 102 | 0.7 |
| Carboxymethylcellulose[4] | — | — | 96 | 0.5 | — | — | — | — |
| Polyethylene oxide | 41 | 0.7 | 128 | 0.6 | — | — | 102 | 0.7 |
| Monoethanolamine | 41 | 0.7 | 128 | 0.6 | — | — | 102 | 0.7 |
| Lactic acid | — | — | 128 | 0.6 | — | — | — | — |
| Water | 2000 | 32.1 | 5020 | 24.7 | 4150 | 30.4 | 4000 | 27.7 |
| Extrusion speed cm/min | 50 | | 10 | | 45 | | 50 | |
| Drying time days | 8 | | 28 | | 10 | | 10 | |
| Bursting hardness N/cm$^2$ | 181 | | 50 | | 150 | | 283 | |
| Catalytic activity, % of Example 1 | 100 | | 80 | | 95 | | 100 | |
| Appearance of honeycombs | satisfactory | | many longitudinal cracks, severe distortion | | slight longitudinal cracks, no distortion, dimensionally stable | | satisfactory | |
| Temperature change stability | no cracks | | additional cracks | | no cracks | | no cracks | |

[1]: together produces spinel powder
[2]: carbon fibers: on average 3 mm in length and 5 micrometers in diameter
[3]: hydroxymethylcellulose: Walocel ® wallpaper glue from . . .
[4]: carboxymethylcellulose: Kikkolate ® NB-L from Nichirin Chemical Co. Ltd., Japan
[5]: polyethylene oxide: Alkox ® E 160 from Meisei Chemical Industries Co. Ltd., Japan

We claim:

1. The process for preparing spinel extrudates by extruding molding compositions comprising spinel powder with or without extrusion assistants, stabilizers, shrinkage reducers, pore-formers or mixtures thereof, subsequent drying and calcination of the extrudates, wherein the molding composition further comprises aluminum oxides or aluminum oxide hydrates and metal nitrates.

2. The process of claim 1, wherein the molding composition is extruded into honeycomb structures.

3. The process of claim 1, wherein the spinel powder used is a copper—aluminum spinel powder which may be 0–10% by weight replaced by ZrO$_2$, CeO$_2$, SnO$_2$, WO$_3$, MoO$_3$, TiO$_2$, V$_2$O$_5$, Nb$_2$O$_3$, La$_2$O$_3$ or mixtures thereof and additionally doped with noble metals.

4. The process of claim 1, wherein said metal nitrate is copper nitrate and wherein aluminum oxide hydrate and copper nitrate are used in a molar ratio of Cu:Al of from 0.3 to 0.7.

5. The process of claim 1, wherein the aluminum oxide hydrate used is aluminum oxide hydroxide, aluminum trihydroxide or mixtures thereof.

6. The process of claim 1, wherein said metal nitrate is copper nitrate and wherein the amount of aluminum oxide hydrate and copper nitrate, reckoned as AlOOH and $Cu(NO_3)_2 \times 3H_2O$, is within the range from 15 to 55% by weight, based on the amount of spinel powder.

7. The process of claim 6, wherein boehmite and copper nitrate with the latter having a water content of from 2 to 6 mol are used.

8. Honeycomb structures obtained by a process as claimed in claim 2, wherein the extrudate is dried at 10–200° C.; or freeze-dried at from −40 to 0° C. under a pressure of from 0.05 to 0.8 bar; and calcined at 500–900° C.

* * * * *